(12) United States Patent
Hiraishi et al.

(10) Patent No.: US 11,976,189 B2
(45) Date of Patent: May 7, 2024

(54) THERMOPLASTIC RESIN COMPOSITION AND MOLDED ARTICLE

(71) Applicants: Techno-UMG Co., Ltd., Tokyo (JP); Mitsubishi Chemical Corporation, Tokyo (JP)

(72) Inventors: Kentaro Hiraishi, Tokyo (JP); Naotoshi Oohashi, Tokyo (JP); Ichiro Kamata, Tokyo (JP)

(73) Assignees: TECHNO-UMG CO., LTD., Tokyo (JP); MITSUBISHI CHEMICAL CORPORATION, Tokyo (JP)

(*) Notice: Subject to any disclaimer, the term of this patent is extended or adjusted under 35 U.S.C. 154(b) by 0 days.

(21) Appl. No.: 18/278,705

(22) PCT Filed: Mar. 25, 2022

(86) PCT No.: PCT/JP2022/014645
§ 371 (c)(1),
(2) Date: Oct. 6, 2023

(87) PCT Pub. No.: WO2022/210417
PCT Pub. Date: Oct. 6, 2022

(65) Prior Publication Data
US 2024/0043678 A1  Feb. 8, 2024

(30) Foreign Application Priority Data
Mar. 31, 2021  (JP) .................. 2021-059491

(51) Int. Cl.
C08L 33/12   (2006.01)
C08K 3/105   (2018.01)
C08L 51/08   (2006.01)
C08K 3/08    (2006.01)

(52) U.S. Cl.
CPC ............ C08L 33/12 (2013.01); C08K 3/105 (2018.01); C08L 51/085 (2013.01); C08K 2003/0825 (2013.01); C08L 2203/30 (2013.01)

(58) Field of Classification Search
CPC ...... C08F 285/00; C08L 51/04; C08L 51/085; C08L 33/08; C08L 33/10; C08L 33/12; C08K 3/105
See application file for complete search history.

(56) References Cited

U.S. PATENT DOCUMENTS 5,543,460 A  *  8/1996  Yamamoto .......... C08L 101/00
                                                525/70
5,604,287 A     2/1997  Yamao 2010/0187965 A1 *  7/2010  Wakita ............... C23C 14/20
                                                525/228
2015/0267048 A1    9/2015  Wakita et al.
2017/0137620 A1 *  5/2017  Iwanaga ............ C08F 283/124
2017/0145173 A1    5/2017  Matsunaga et al.
2018/0030240 A1    2/2018  Matsuoka et al.
2021/0040312 A1 *  2/2021  Kakimoto ........... C08L 51/04

FOREIGN PATENT DOCUMENTS

| EP | 3085715 A1 * | 10/2016 | ............ B29D 7/01 |
| JP | 2002-371167 | 12/2002 | |
| JP | 2008-056712 | 3/2008 | |
| JP | 2016-164283 | 9/2016 | |
| JP | 2017-511818 | 4/2017 | |
| JP | 2019-163411 | 9/2019 | |
| JP | 2021-075708 | 5/2021 | |
| WO | 95/25142 | 9/1995 | |
| WO | WO 2011/078286 * | 6/2011 | |
| WO | 2015/116611 | 8/2015 | |
| WO | 2015/194574 | 12/2015 | |
| WO | 2016/136726 | 9/2016 | |
| WO | WO 2019/176763 * | 9/2019 | |
| WO | WO-2023208918 A1 * | 11/2023 | |

OTHER PUBLICATIONS

International Search Report dated Jun. 21, 2022 in International (PCT) Application No. PCT/JP2022/014645, with English translation.

Written Opinion of the International Searching Authority dated Jun. 21, 2022 in International (PCT) Application No. PCT/JP2022/014645, with English translation

* cited by examiner

Primary Examiner — Marc S Zimmer
(74) Attorney, Agent, or Firm — WENDEROTH, LIND & PONACK, L.L.P.

(57) ABSTRACT

A thermoplastic resin composition comprising a graft copolymer (A), a vinyl copolymer (B), and a metal component (C), wherein: an amount of the metal component (C) is 60 ppm or more relative to a total mass of the thermoplastic resin composition, the graft copolymer (A) is a graft polymer obtained by polymerizing 80% by mass to 20% by mass of a vinyl monomer mixture (m1) including at least one type of vinyl monomer in the presence of 20% by mass to 80% by mass of a rubbery polymer (a) including a polyorganosiloxane and an alkyl (meth)acrylate polymer, the vinyl copolymer (B) is a vinyl copolymer obtained by polymerizing a vinyl monomer mixture (m2) including an alkyl (meth)acrylate monomer, and the metal component (C) is an alkali metal.

5 Claims, No Drawings

THERMOPLASTIC RESIN COMPOSITION AND MOLDED ARTICLE

TECHNICAL FIELD

The present invention relates to a thermoplastic resin composition and a molded article thereof.

Priority is claimed on Japanese Patent Application No. 2021-059491, filed Mar. 31, 2021, the contents of which are incorporated herein by reference.

BACKGROUND ART

The improvement of the impact resistance of molded articles increases their industrial values in terms of, for example, expansion of the applications of the molded articles. Therefore, various methods have been proposed heretofore to improve the impact resistance of molded articles. Among such methods, there is an already industrialized method, which uses a resin material in which a rubbery polymer and a hard resin are combined to enhance the impact resistance of molded articles while retaining the inherent properties of the hard resin. Examples of such resin materials include acrylonitrile-styrene-acrylate (ASA) resins, acrylonitrile-ethylene/α-olefin-styrene (AES) resins, and thermoplastic resin compositions obtained by further adding these to hard resins.

As a thermoplastic resin composition that can provide a molded article excellent in weatherability, impact resistance and appearance, for example, the following has been proposed.

A thermoplastic resin composition including a graft copolymer (A1) obtained by polymerizing an aromatic alkenyl compound and a vinyl cyanide compound on a polyalkyl acrylate rubber, and a polymethyl methacrylate resin (B) (see, for example, Patent Literature 1).

CITATION LIST

Patent Literature

Patent Literature 1: Japanese Unexamined Patent Application Publication No. 2002-371167

SUMMARY OF INVENTION

Technical Problem

The thermoplastic resin of Patent Literature 1 is not free from occurrence of heat discoloration, depending on difference in molding temperature, which results in color difference among the obtained molded articles.

The present invention has been made in view of the above circumstances, and the object of the present invention is to provide a thermoplastic resin composition having excellent resistance to heat discoloration (hereinafter referred to as "heat discoloration resistance") and a molded article thereof.

Solution to Problem

The embodiments of the present invention are as follows.

A thermoplastic resin composition including a graft copolymer (A), a vinyl copolymer (B), and a metal component (C), wherein:
- an amount of the metal component (C) is 60 ppm or more relative to a total mass of the thermoplastic resin composition,
- the graft copolymer (A) is a graft polymer obtained by polymerizing 80% by mass to 20% by mass of a vinyl monomer mixture (m1) including at least one type of vinyl monomer in the presence of 20% by mass to 80% by mass of a rubbery polymer (a) obtained from a polyorganosiloxane and an alkyl (meth)acrylate polymer, provided that a total mass of the rubbery polymer (a) and the vinyl monomer mixture (m1) is 100% by mass,
- the vinyl copolymer (B) is a vinyl copolymer obtained by polymerizing a vinyl monomer mixture (m2) including an alkyl (meth)acrylate monomer, and
- the metal component (C) is an alkali metal.

The thermoplastic resin composition according to [1], wherein the amount of the metal component (C) is 100 ppm to 400 ppm relative to the total mass of the thermoplastic resin composition.

The thermoplastic resin composition according to [1] or [2], wherein the metal component (C) includes potassium.

The thermoplastic resin composition according to any one of [1] to [3], wherein an amount of the graft polymer (A) is 20 parts by mass to 80 parts by mass relative to a total mass of the thermoplastic resin composition.

The thermoplastic resin composition according to any one of [1] to [4], wherein an amount of the graft polymer (A) is preferably 20 parts by mass to 80 parts by mass, more preferably 30 parts by mass to 70 parts by mass, even more preferably 40 parts by mass to 60 parts by mass, relative to a total mass of the thermoplastic resin composition.

The thermoplastic resin composition according to any one of [1] to [5], wherein the amount of the metal component (C) is 60 ppm or more, preferably 100 ppm or more, more preferably 100 ppm to 700 ppm, even more preferably 100 ppm to 400 ppm, relative to the total mass of the thermoplastic resin composition.

The thermoplastic resin composition according to any one of [1] to [6], wherein the polyorganosiloxane is preferably a polyorganosiloxane having a vinyl-polymerizable functional group (vinyl-polymerizable functional group-containing polyorganosiloxane); more preferably a polyorganosiloxane having a vinyl-polymerizable functional group-containing siloxane unit and a dimethylsiloxane unit; even more preferably a polyorganosiloxane having a vinyl-polymerizable functional group-containing siloxane unit and a dimethylsiloxane unit, wherein the vinyl-polymerizable functional group-containing siloxane unit is bonded to the dimethylsiloxane unit via a siloxane bond.

The thermoplastic resin composition according to any one of [1] to [6], wherein the rubbery polymer (a) is preferably a composite rubber in which the polyorganosiloxane and the alkyl (meth)acrylate polymer are combined; more preferably a graft polymer having a polyorganosiloxane-derived structure as a trunk polymer and an alkyl (meth)acrylate polymer-derived structure as a branch polymer.

The thermoplastic resin composition according to any one of [1] to [8], wherein the rubbery polymer (a) is preferably cross-linked between side chains of the alkyl (meth)acrylate polymer.

The thermoplastic resin composition according to any one of [1] to [9], wherein a ratio of the polyorganosiloxane relative to a total mass (100% by weight) of the polyorganosiloxane and the alkyl (meth)acrylate polymer in the rubbery polymer (a) is 3% by weight or more and less than 24% by weight, more preferably 5% by mass or more and 20% by mass or less, even more preferably 7% by mass or more and 15% by mass or less.

The thermoplastic resin composition according to any one of [1] to [10], wherein the vinyl monomer mixture (m1) includes an aromatic vinyl compound, and an amount of the aromatic vinyl compound is preferably 65% by mass to 82% by mass, more preferably 73% by mass to 80% by mass, even more preferably 75% by mass to 80% by mass, based on a total mass (100% by mass) of the vinyl monomer mixture (m1).

The thermoplastic resin composition according to any one of [1] to [11], wherein the vinyl monomer mixture (m1) includes a vinyl cyanide compound, and an amount of the vinyl cyanide compound is preferably 18% by mass to 35% by mass, more preferably 20% by mass to 27% by mass, even more preferably 20% by mass to 25% by mass, based on a total mass (100% by mass) of the vinyl monomer mixture (m1).

The thermoplastic resin composition according to any one of [1] to [12], wherein the metal component (C) preferably includes an alkali metal, and the metal component (C) more preferably includes at least one selected from the group consisting of sodium and potassium.

The thermoplastic resin composition according to any one of [1] to [13], wherein the index Δb* of heat discoloration determined by the method described in the Examples in a later section is preferably 1.0 or less, more preferably 0.8 or less, even more preferably 0.7 or less.

The thermoplastic resin composition according to any one of [1] to [14], which contains a resin consisting essentially of the graft copolymer (A) and the vinyl copolymer (B) described below.

The thermoplastic resin composition according to any one of [1] to [14], which contains a resin consisting of the graft copolymer (A) and the vinyl copolymer (B).

A molded article formed from the thermoplastic resin composition of any one of [1] to [16].

A method for producing a rubbery polymer (a), including a step (radical polymerization step) of radically polymerizing a monomer component including at least one alkyl (meth)acrylate in the presence of a latex of polyorganosiloxane, to thereby obtain a copolymer latex.

The method according to [17], which further includes a step of polymerizing a siloxane mixture including a dimethylsiloxane oligomer and a vinyl-polymerizable functional group-containing siloxane in the presence of an emulsifier containing a metal component (C), to thereby obtain the latex of polyorganosiloxane.

The method according to [18], wherein an amount of the emulsifier used is preferably 0.05 parts by mass to 5 parts by mass, more preferably 0.1 part by mass to 3 parts by mass, even more preferably 0.3 parts by mass to 2.0 parts by mass, relative to 100 parts by mass of the siloxane mixture.

The method according to any one of [17] to [19], wherein the metal component (C) preferably includes an alkali metal, and the metal component (C) more preferably includes at least one selected from the group consisting of sodium and potassium.

A method for producing a graft copolymer (A), including a step of polymerizing a vinyl monomer mixture (m1) in the presence of the rubbery polymer (a) obtained by the method of any one of [17] to [20], to thereby obtain a graft copolymer (A).

A method for producing a thermoplastic resin composition, including a step of mixing the graft copolymer (A) obtained by the method of [21], a vinyl copolymer (B), and a metal component (C), to thereby obtain a thermoplastic resin composition.

Advantageous Effects of Invention

The present invention can provide a thermoplastic resin composition having excellent heat discoloration resistance, and a molded article thereof.

DESCRIPTION OF EMBODIMENTS

Throughout the present specification and claims, the following terms have respective meanings as explained below.

The term "(meta)acrylate" means acrylate and methacrylate.

The "molded article" is a product obtained by molding a thermoplastic resin composition.

Further, "to" indicating a numerical range means that the numerical values described before and after "to" are included as the lower limit and the upper limit of the range.

[Thermoplastic Resin Composition]

The thermoplastic resin composition of the first aspect of the present invention includes a graft copolymer (A), a graft copolymer (B), a vinyl copolymer (C), and a metal component (C). The thermoplastic resin composition of the present embodiment may optionally contain other thermoplastic resins and various additives so far as the effects of the present invention are not impaired.

The graft copolymer (A) is a product obtained by polymerizing 80% by mass to 20% by mass of a vinyl monomer mixture (m1) including at least one type of vinyl monomer in the presence of 20% by mass to 80% by mass of a rubbery polymer (a) including a polyorganosiloxane and an alkyl (meth)acrylate polymer.

The graft copolymer (B) is one obtained by polymerizing a vinyl monomer mixture (m2) including an alkyl (meth) acrylate monomer.

The metal component (C) is an alkali metal.

The components ((A) to (C), (m1), (m2), etc.) are described below.

[Polyorganosiloxane]

The polyorganosiloxane is not particularly limited, but is preferably a polyorganosiloxane having a vinyl-polymerizable functional group (vinyl-polymerizable functional group-containing polyorganosiloxane), more preferably a polyorganosiloxane having a vinyl-polymerizable functional group-containing siloxane units and dimethylsiloxane units.

Examples of vinyl-polymerizable functional groups include methacryloyloxyalkyl groups, acryloyloxyalkyl groups, vinyl groups, and vinyl-substituted phenyl groups. The number of carbon atoms in the alkyl group of the methacryloyloxyalkyl group and the acryloyloxyalkyl group may be, for example, 1 to 20.

The vinyl-polymerizable functional group-containing siloxane unit may have organic groups other than the vinyl-polymerizable functional group. Examples of other organic groups include alkyl groups such as a methyl group, a phenyl group, and the like.

The proportion of the vinyl-polymerizable functional group-containing siloxane unit is preferably 0.3 to 3 mol %, relative to the total number of moles (100 mol %) of units constituting the polyorganosiloxane. When the proportion of the vinyl-polymerizable functional group-containing siloxane unit is within the above range, the polyorganosiloxane and the alkyl (meth)acrylate polymer are sufficiently combined, and the polyorganosiloxane is less likely to bleed out from the surface of the molded article.

Further, the molded article improves further in terms of the impact resistance as well as the color development.

For further improving the color development, the polyorganosiloxane is preferably one in which the proportion of a silicon atom having 3 or more siloxane bonds is 0 mol % to 1 mol %, relative to the total number of moles (100 mol %) of all silicon atoms in the polyorganosiloxane.

One preferred embodiment of the polyorganosiloxane is a polyorganosiloxane composed of 0.3 mol % to 3 mol % of the vinyl-polymerizable functional group-containing siloxane units and 99.7 mol % to 97 mol % of the dimethylsiloxane units, provided that a sum of amounts of the vinyl-polymerizable functional group-containing siloxane units and the dimethylsiloxane units is 100 mol %, in which the proportion of a silicon atom having 3 or more siloxane bonds is 1 mol % or less, based on the total number of moles of all silicon atoms.

The average particle size of the polyorganosiloxane is not particularly limited, but is preferably 400 nm or less, more preferably 150 nm or less in terms of further improvement of the color development of the molded article. The lower limit of the average particle size is preferably 20 nm or more.

In this context, the average particle size of the polyorganosiloxane is a value (mass average particle size) calculated from a mass-based particle size distribution obtained by measurement using a dynamic light scattering type particle size distribution analyzer.

[Method for Producing Polyorganosiloxane]

The polyorganosiloxane can be obtained, for example, by polymerizing a siloxane mixture containing a dimethylsiloxane oligomer and a vinyl-polymerizable functional group-containing siloxane.

The dimethylsiloxane oligomer is preferably a cyclic dimethylsiloxane having a 3 or more-membered ring structure, more preferably a cyclic dimethylsiloxane having a 3- to 7-membered ring structure. Specific examples thereof include hexamethylcyclotrisiloxane, octamethylcyclotetrasiloxane, decamethylcyclopentasiloxane, dodecamethylcyclohexasiloxane, and the like. With respect to these dimethylsiloxane oligomers, a single type thereof may be used individually or two or more types thereof may be used in combination.

The vinyl-polymerizable functional group-containing siloxane is not particularly limited so long as it contains a vinyl-polymerizable functional group and can bond with the dimethylsiloxane oligomer via a siloxane bond, but is preferably a vinyl-polymerizable functional group-containing alkoxysilane compound in consideration of the reactivity with the dimethylsiloxane oligomer.

Specific examples of vinyl-polymerizable functional group-containing alkoxysilane compounds include methacryloyloxysiloxanes, such as (3-methacryloyloxyethyldimethoxymethylsilane, γ-methacryloyloxypropyldimethoxymethylsilane, γ-methacryloyloxypropylmethoxydimethylsilane, γ-methacryloyloxypropyltrimethoxysilane, γ-methacryloyloxypropylethoxydiethylsilane, γ-methacryloyloxypropyldiethoxymethylsilane, and δ-methacryloyloxybutyldiethoxymethylsilane; and vinyl siloxanes, such as tetramethyltetravinylcyclotetrasiloxane, and p-vinylphenyldimethoxymethylsilane. One of these vinyl-polymerizable functional group-containing siloxanes may be used alone, or two or more of these may be used in combination.

The method for polymerizing the siloxane mixture is not particularly limited, but is preferably an emulsion polymerization. The emulsion polymerization of the siloxane mixture is typically carried out using an emulsifier, water and an acid catalyst.

An anionic emulsifier is preferred as the emulsifier. Specific examples thereof include sodium alkylbenzenesulfonate, sodium laurylsulfonate, and sodium polyoxyethylene nonylphenyl ether sulfate. Among these, sulfonic acid-based emulsifiers such as sodium alkylbenzenesulfonate and sodium laurylsulfonate are preferred.

One of these emulsifiers may be used alone, or two or more of these may be used in combination.

The amount of the emulsifier used is preferably 0.05 parts by mass to 5 parts by mass with respect to 100 parts by mass of the siloxane mixture. When the amount of the emulsifier used is 0.05 parts by mass or more, the dispersed state of the siloxane mixture tends to be stable, and the emulsified state with fine particles can be easily maintained. On the other hand, when the emulsifier is used in an amount of 5 parts by mass or less, it is possible to suppress the discoloration of the molded article due to the emulsifier.

Examples of acid catalysts include organic acid catalysts, such as sulfonic acids (e.g., aliphatic sulfonic acids, aliphatic-substituted benzenesulfonic acids, aliphatic-substituted naphthalenesulfonic acids, etc.); and inorganic acid catalysts, such as mineral acids (e.g., sulfuric acid, hydrochloric acid, nitric acid, etc.). With respect to these acid catalysts, a single type thereof may be used individually or two or more types thereof may be used in combination.

Among these, aliphatic-substituted benzenesulfonic acids are preferable, and n-dodecylbenzenesulfonic acid is particularly preferable in that excellent stabilizing action for the siloxane latex described later is achievable. In addition, when n-dodecylbenzenesulfonic acid and a mineral acid such as sulfuric acid are used together, the influence of the color of the emulsifier used in the production of the polyorganosiloxane on the color of the molded article can be reduced.

The amount of the acid catalyst to be added may be appropriately set, but is usually about 0.1 part by mass to 20 parts by mass with respect to 100 parts by mass of the siloxane mixture.

The acid catalyst may be mixed at the time of mixing the siloxane mixture, the emulsifier, and water, or may be mixed with micronized siloxane latex obtained by micronizing a latex (siloxane latex) obtained by emulsifying a mixture of the siloxane mixture, the emulsifier, and water.

It is preferable to mix the acid catalyst with micronized siloxane latex obtained by micronizing a siloxane latex, since the particle size of the resulting polyorganosiloxane can be easily controlled. In particular, it is preferable to drop the micronized siloxane latex into an aqueous solution of the acid catalyst at a constant rate.

When the acid catalyst is mixed at the time of mixing the siloxane mixture, the emulsifier and water, it is preferable to micronize the resulting mixture.

The siloxane latex can be micronized by using, for example, a homomixer or a homogenizer. The homomixer implements micronization by shearing force due to high-speed rotation. The homogenizer implements micronization with ejection force of a high-pressure generator.

Examples of methods for mixing the siloxane mixture, the emulsifier, water and the acid catalyst, or methods for mixing the micronized siloxane latex and the acid catalyst include a mixing method employing high-speed stirring, and a mixing method employing a high-pressure emulsifying device such as a homogenizer. Among them, the method using a homogenizer is preferable because the distribution of the particle size of the polyorganosiloxane can be narrowed.

The polymerization temperature is preferably 50° C. or higher, more preferably 80° C. or higher.

In the case of dropping the micronized siloxane latex into the acid catalyst aqueous solution, the temperature of the acid catalyst aqueous solution is preferably 50° C. or higher, more preferably 80° C. or higher.

The polymerization time is preferably 2 hours or more, more preferably 5 hours or more, when the acid catalyst is mixed at the time of mixing the siloxane mixture, the emulsifier and water. On the other hand, when the micronized siloxane latex and the acid catalyst are mixed, it is preferable to drop the micronized siloxane latex into the acid catalyst aqueous solution, followed by holding the resulting for about 1 hour.

The polymerization can be terminated by neutralizing the cooled reaction solution with an alkaline substance such as sodium hydroxide, potassium hydroxide or sodium carbonate, so as to adjust the pH of the reaction solution at 25° C. to about 6 to 8.

Thus, a latex of polyorganosiloxane is obtained.

The average particle size of the polyorganosiloxane can be controlled by adjusting the composition of the siloxane mixture, the amount of acid catalyst used (amount of the acid catalyst in the acid catalyst aqueous solution), the polymerization temperature, and the like.

For example, as the amount of acid catalyst used is decreased, the average particle size tends to increase, and as the polymerization temperature is increased, the average particle size tends to decrease.

[Alkyl (Meth)Acrylate Polymer]

The alkyl (meth)acrylate polymer is a polymer having alkyl (meth)acrylate units.

The alkyl (meth)acrylate polymer may further has monomer (other monomer) units other than the alkyl (meth)acrylate units.

The number of carbon atoms in the alkyl group of the alkyl (meth)acrylate may be, for example, 1 to 20.

Examples of alkyl (meth)acrylate include alkyl acrylates, such as methyl acrylate, ethyl acrylate, n-propyl acrylate, n-butyl acrylate, and 2-ethylhexyl acrylate; and alkyl methacrylates, such as hexyl methacrylate, 2-ethylhexyl methacrylate, and n-lauryl methacrylate.

With respect to these alkyl (meth)acrylates, a single type thereof may be used individually or two or more types thereof may be used in combination. Among these, n-butyl acrylate is preferable in terms of further improvement of the impact resistance of the molded article.

The other monomers are not particularly limited as long as they are copolymerizable with the alkyl (meth)acrylate, and examples thereof include aromatic vinyl compounds (e.g., styrene, α-methylstyrene, p-methylstyrene, etc.), vinyl cyanide compounds (e.g., acrylonitrile, methacrylonitrile, etc.), and the like. One of these other monomers may be used alone, or two or more thereof may be used in combination.

The proportion of the alkyl (meth)acrylate units in the alkyl (meth)acrylate polymer is preferably 80% by mass to 100% by mass, more preferably 90% by mass to 100% by mass, based on the total mass of all monomer units in the alkyl (meth)acrylate polymer.

The alkyl (meth)acrylate polymer is obtained by polymerizing a monomer component including at least one type of alkyl (meth)acrylate. This monomer component may contain other monomers.

The method for polymerizing the monomer component is not particularly limited, and the polymerization can be carried out according to known methods.

[Rubbery Polymer (a)]

The rubbery polymer (a) is a composite rubber in which a polyorganosiloxane and an alkyl (meth)acrylate polymer are combined. In the context of the present specification, the "composite rubber" may be one containing at least one type of polymer, or may be a graft polymer having a trunk polymer and a branch polymer.

In the rubbery polymer (a), the ratio of the polyorganosiloxane relative to the total mass (100% by mass) of the polyorganosiloxane and the alkyl (meth)acrylate polymer is not particularly limited, but is preferably 3% by mass or more and less than 24% by mass. When the ratio of the polyorganosiloxane in the rubbery polymer (a) is within the above range, the resulting molded article improves further in terms of impact resistance and color development.

The rubbery polymer (a) is in the form of particles and is also present in the form of particles in the thermoplastic resin composition.

The volume average particle size of the rubbery polymer (a) is not particularly limited, but is preferably 50 nm or more and less than 120 nm. When the volume average particle size of the rubbery polymer (a) is within the above range, the resulting molded article improves further in terms of impact resistance and color development.

In this context, the volume average particle size of the rubbery polymer (a) is a value calculated from a volume-based particle size distribution obtained by measurement using a dynamic light scattering particle size distribution analyzer.

The ratio of particles having a particle size of more than 200 nm to all particles in the rubber-like polymer (a) is preferably less than 5% by volume. That is, the rubbery polymer (a) preferably has a (volume-based) particle size distribution in which particles having a particle size of more than 200 nm account for less than 5% by volume of all particles. When the ratio of particles having a particle diameter of more than 200 nm is less than 5% by volume, the molded article improves further in terms of color development.

The ratio of particles having a particle size of more than 200 nm is a value calculated from a volume-based particle size distribution of the rubbery polymer (a) measured using a dynamic light scattering particle size distribution analyzer.

[Method for Producing Rubbery Polymer (a)]

The method for producing the rubbery polymer (a) is not particularly limited. Examples of the method include a method in which a plurality of latexes respectively containing the polyorganosiloxane and the alkyl (meth)acrylate polymer are heteroaggregated or co-enlarged; and a method in which, in the presence of a latex containing either one of the polyorganosiloxane and the alkyl (meth)acrylate polymer, a monomer component for forming the other one of the polymers is polymerized to form a composite polymer.

Since the volume average particle size of the rubbery polymer (a) can be easily adjusted to fall within the above range, it is preferable to employ a method including a step (radical polymerization step) of radically polymerizing a monomer component including at least one alkyl (meth)acrylate in the presence of a latex of polyorganosiloxane, to thereby obtain a copolymer latex.

The radical polymerization step is a step of radically polymerizing a monomer component including at least one type of alkyl (meth)acrylate in the presence of a latex of polyorganosiloxane. The monomer component including at least one type of alkyl (meth)acrylate may be added to the latex of polyorganosiloxane all at once, continuously or intermittently.

The polymerization conditions may be, for example, at 30 to 95° C. for 1 to 10 hours.

When radically polymerizing a monomer component including at least one alkyl (meth)acrylate, a graft crossing agent or a cross-linking agent may be used as necessary. Examples of graft crossing agents or cross-linking agents include allyl methacrylate, triallyl cyanurate, triallyl isocyanurate, divinylbenzene, di(ethylene glycol) dimethacrylate, di(propylene glycol) dimethacrylate, di(1,3-butylene glycol) dimethacrylate, di(1,4-butylene glycol) dimethacrylate, and the like. One of these may be used alone, or two or more of these may be used in combination.

The radical polymerization is usually carried out using a radical polymerization initiator and an emulsifier.

Examples of radical polymerization initiators include peroxides, azo initiators, redox initiators in which an oxidizing agent and a reducing agent are combined, and the like. Among these, redox initiators are preferable, and sulfoxylate initiators obtained by combining ferrous sulfate, disodium ethylenediaminetetraacetate, sodium formaldehyde sulfoxylate, and hydroperoxide are particularly preferred.

The emulsifier is not particularly limited, but it is preferable to use carboxylates, such as sodium sarcosinate, a potassium fatty acid ester, a sodium fatty acid ester, a dipotassium alkenyl succinate, and a rosinate soap, in terms of excellent stability of the latex during the radical polymerization and higher polymerization rate. Among these, a dipotassium alkenylsuccinate is preferable because it can suppress gas generation when the obtained graft copolymer (B) and the thermoplastic resin composition containing the same are molded at high temperature. Specific examples of dipotassium alkenyl succinates include dipotassium octadecenyl succinate, dipotassium heptadecenyl succinate, and dipotassium hexadecenyl succinate. One of these emulsifiers may be used alone, or two or more of these may be used in combination.

[Vinyl Monomer Mixture (m1)]

With respect to the vinyl monomer mixture (m1), there is no particular limitation so long as it includes at least one type of vinyl monomer, but the vinyl monomer mixture (m1) is preferably a monomer mixture including an aromatic vinyl compound and a vinyl cyanide compound.

Further, other monomers copolymerizable with these may be included so long as the effects of the present invention are not impaired.

Examples of aromatic vinyl compounds include styrene, α-methylstyrene, o-, m- or p-methylstyrene, vinylxylene, p-t-butylstyrene, ethylstyrene and the like. Among these, styrene and α-methylstyrene are preferable in terms of the fluidity of the thermoplastic resin composition, the color development of the molded article, and the impact resistance of the molded article. One of these aromatic vinyl compounds may be used alone, or two or more thereof may be used in combination.

Examples of vinyl cyanide compounds include acrylonitrile and methacrylonitrile. One of these vinyl cyanide compounds may be used alone, or two or more types thereof may be used in combination.

Examples of other monomers include acrylates (methyl acrylate, ethyl acrylate, propyl acrylate, butyl acrylate, etc.), methacrylates (methyl methacrylate, ethyl methacrylate, propyl methacrylate, butyl methacrylate, etc.), maleimide monomers (N-cyclohexylmaleimide, N-phenylmaleimide, etc.), and the like. With respect to the other monomers, a single type thereof may be used individually or two or more types thereof may be used in combination.

The proportions of the monomer components constituting the vinyl monomer mixture (m1) are not particularly limited, but the proportion of the aromatic vinyl compound is preferably 65% by mass to 82% by mass, more preferably 73% by mass to 80% by mass, even more preferably 75% by mass to 80% by mass, based on the total mass (100% by mass) of the vinyl monomer mixture (m1). When the proportion of the aromatic vinyl compound is within the above range, the molded article shows further improved impact resistance and color development.

Further, the proportion of the vinyl cyanide compound is preferably 18% by mass to 35% by mass, more preferably 20% by mass to 27% by mass, even more preferably 20% by mass to 25% by mass, based on the total mass (100% by mass) of the vinyl monomer mixture (m1). When the proportion of the vinyl cyanide compound is within the above range, the molded article shows further improved impact resistance and color development.

[Graft Copolymer (A)]

The graft copolymer (A) is a copolymer obtained by polymerizing a vinyl monomer mixture (m1) in the presence of a rubbery polymer (a).

As regards the graft copolymer (A), it is difficult to specify how the vinyl monomer mixture (m1) is polymerized in the presence of the rubbery polymer (a). That is, there exists a situation (impossible/impractical situation) which makes it impossible or almost impractical to directly specify the graft copolymer (A) in terms of its structure or properties. Therefore, it is more appropriate to define the graft copolymer (A) as "obtained by polymerizing a vinyl monomer mixture (m1) in the presence of a rubbery polymer (a)".

With respect to the mass ratios of the rubbery polymer (a) and the vinyl monomer mixture (m1) including at least one type of vinyl monomer, it is preferable that the rubbery polymer (a) accounts for 20% by mass to 80% by mass, and the vinyl monomer mixture (m1) of at least one type of vinyl monomer accounts for 80% by mass to 20% by mass, and it is more preferable that the rubbery polymer (a) accounts for 30% by mass to 70% by mass, and the vinyl monomer mixture (m1) of at least one type of vinyl monomer accounts for 70% by mass to 30% by mass, with the proviso that a sum of amounts of the rubbery polymer (a) and the vinyl monomer mixture (m1) of at least one type of vinyl monomer is 100% by mass. When the mass ratio of the rubbery polymer (a) is less than 20% by mass, the resulting molded article tends to become inferior in terms of impact resistance. When the mass ratio exceeds 80% by mass, the resulting molded article tends to become inferior in terms of color development, and the fluidity of the thermoplastic resin composition tends to decrease as well.

[Method for Producing Graft Copolymer (A)]

The graft copolymer (A) is obtained by polymerizing the vinyl monomer mixture (m1) in the presence of the rubbery polymer (a).

The method for performing the polymerization is not particularly limited, but an emulsion polymerization is preferable because the reaction can be controlled so as to proceed stably. Specific examples of the polymerization method include a method in which the vinyl monomer mixture (m1) is fed at once into a latex of the rubber polymer (a) and then polymerized; a method in which a part of the vinyl monomer mixture (m1) is fed into the latex of the rubber polymer (a) in advance, and the rest of the vinyl monomer mixture (m1) is dropped onto the polymerization system while allowing the polymerization to proceed; a method in which the polymerization is implemented while dropping the entire amount of the vinyl monomer mixture (m1) onto the latex of the rubbery polymer (a). The polymerization may be carried out in a single stage or may be divided into two or more stages. When the polymerization is divided into two or more stages, it is also possible to change the types and proportions of monomers constituting the vinyl monomer mixture (m1) in the respective stages.

The emulsion polymerization is usually carried out using a radical polymerization initiator and an emulsifier. Examples of these radical polymerization initiators and emulsifiers include those radical polymerization initiators and emulsifiers which are listed above in the description of the method for producing the rubbery polymer (a).

When implementing the polymerization, any of various known chain transfer agents may be added in order to control the molecular weight and graft ratio of the graft copolymer (A) to be obtained.

The polymerization conditions may be, for example, at 30 to 95° C. for 1 to 10 hours.

The graft copolymer (A) obtained by the emulsification polymerization is usually in the form of a latex.

Examples of the method for recovering the graft copolymer (A) from the latex of the graft copolymer (A) include a wet method in which the latex of the graft copolymer (A) is put into hot water having a coagulant dissolved therein, thereby coagulating the latex into a slurry; and a spray-drying method in which the latex of the graft copolymer (A) is sprayed to a heated atmosphere, thereby semi-directly recovering the graft copolymer (A).

Examples of the coagulant used in the wet method include inorganic acids such as sulfuric acid, hydrochloric acid, phosphoric acid and nitric acid; and metal salts such as calcium chloride, calcium acetate and aluminum sulfate, which are selected in view of the emulsifier used in the polymerization. For example, when only a carboxylic acid soap, such as a fatty acid soap or a rosinate soap, is used as the emulsifier, one or more of the coagulants described above may be used. When an emulsifier showing stable emulsifying effect even at a pH in the acidic range, such as sodium alkylbenzene sulfonate, is used as the emulsifier, a metal salt is suitable as the coagulant.

When the wet method is employed, a graft copolymer (A) in the form of a slurry is obtained.

Examples of the method for obtaining a dried graft copolymer (A) from a slurry of the graft copolymer (A) include a method in which, first, the residual emulsifier in the slurry is eluted into water and washed away, and then the slurry is dehydrated by centrifugation or dehydration with a dehydrator or the like, followed by drying with an air flow dryer or the like; and a method in which dehydration and drying are simultaneously implemented with a squeezing dehydrator or an extruder. By such methods, a dried graft copolymer (A) in the form of a powder or particles is obtained.

The washing conditions are not particularly limited, but the washing is preferably implemented under the conditions that reduce the residual emulsifier content to 0.3% by mass to 2% by mass or less relative to 100% by mass of the dried graft copolymer (A). When the residual emulsifier content in the graft copolymer (A) is 0.3% by mass or more, the fluidity of the obtained graft copolymer (A) and the thermoplastic resin composition containing the same tends to improve further. On the other hand, when the residual emulsifier content in the graft copolymer (A) is 2% by mass or less, it is possible to suppress gas generation during high-temperature molding of the thermoplastic resin composition. The residual emulsifier content can be controlled by, for example, adjusting washing time, etc.

The drying temperature may be, for example, 50° C. to 90° C.

The volume average particle size and the volume-based particle size distribution of the rubbery polymer (a) in the obtained graft copolymer (A) are the same as the volume average particle size and volume-based particle size distribution of the rubbery polymer (a) in the latex of the rubbery polymer (a), which is used in the production of the graft copolymer (A).

It is also possible to send the graft copolymer (A) discharged from the squeezing dehydrator or the extruder directly, without recovering the graft copolymer (A), to an extruder or a molding machine for producing the resin composition to thereby obtain a molded article.

[Vinyl Monomer Mixture (m2)]

The vinyl monomer mixture (m2) is a monomer mixture including at least an alkyl (meth)acrylate monomer.

The vinyl monomer mixture (m2) may include, in addition to the alkyl (meth)acrylate monomer, other monomers copolymerizable therewith so long as the effects of the present invention are not impaired.

Examples of alkyl (meth)acrylate monomers include methyl methacrylate, ethyl methacrylate, n-propyl methacrylate, i-propyl methacrylate, n-butyl methacrylate, i-butyl methacrylate, t-butyl methacrylate, amyl methacrylate, isoamyl methacrylate, octyl methacrylate, 2-ethylhexyl methacrylate, decyl methacrylate, lauryl methacrylate, cyclohexyl methacrylate, benzyl methacrylate, phenyl methacrylate, methyl acrylate, ethyl acrylate, propyl acrylate, butyl acrylate, and the like. The alkyl(meth)acrylate monomer is preferably an alkyl(meth)acrylate monomer having a hydrocarbon group having 1 to 8 carbon atoms. At least one of methyl methacrylate and ethyl methacrylate is preferable in terms of further improvement of heat resistance and impact resistance of the molded article. With respect to the alkyl (meth)acrylate monomer, a single type thereof may be used individually or two or more types thereof may be used in combination.

Examples of the other monomers include the aromatic vinyl compounds and vinyl cyanide compounds listed above in the description of the vinyl monomer mixture (m1). With respect to the other monomers, a single type thereof may be used individually or two or more types thereof may be used in combination.

The proportion of the alkyl (meth)acrylate monomer included in the vinyl monomer mixture (m2) is not particularly limited, but is preferably 50% by mass or more, more preferably 70% by mass or more, even more preferably 90% by mass or more, based on the total mass (100% by mass) of the vinyl monomer mixture (m2). When the proportion of the alkyl (meth)acrylate monomer is within the above range, the molded article shows further improved impact resistance and color development.

[Vinyl Copolymer (B)]

The vinyl copolymer (B) is a copolymer obtained by polymerizing the vinyl monomer mixture (m2).

[Method for Producing Vinyl Copolymer (B)]

The vinyl copolymer (B) is a polymer of the vinyl monomer mixture (m2). The vinyl copolymer (B) contains at least units derived from the alkyl (meth)acrylate monomer.

The proportion of units derived from the alkyl (meth) acrylate monomer included in the vinyl copolymer (B) is not particularly limited, but is preferably 50% by mass or more, more preferably 70% by mass or more, even more preferably 90% by mass or more, based on the total mass (100% by mass) of the vinyl monomer mixture (m2). When the proportion of units derived from the alkyl (meth)acrylate monomer is within the above range, the molded article shows further improved impact resistance and color development.

The mass average molecular weight (Mw) of the vinyl copolymer (B) may be, for example, 5,000 to 500,000.

The mass average molecular weight of the vinyl copolymer (B) is a standard polystyrene-equivalent value measured by gel permeation chromatography (GPC).

As the vinyl copolymer (B), one type of the polymer may be used alone, or two or more types of the polymer may be used in combination.

The vinyl copolymer (B) is obtained by polymerizing the vinyl monomer mixture (m2). The polymerization method for the vinyl monomer mixture (m2) is not particularly limited. Examples of the polymerization method include known polymerization methods, such as an emulsion polymerization method, a suspension polymerization method, and a solution polymerization method.

When the vinyl monomer mixture (m2) includes two or more types of monomers, the resulting vinyl copolymer (B) is typically a random copolymer in which units derived from these two or more types of monomers are randomly arranged.

For producing the vinyl copolymer (B) by the emulsion polymerization method, for example, the production can be implemented by a method in which the vinyl monomer mixture (m2), an emulsifier, a polymerization initiator and a chain transfer agent are fed into a reactor and heated to perform polymerization, thereby obtaining an aqueous dispersion containing the vinyl copolymer (B), and the vinyl copolymer (B) is recovered from the aqueous dispersion by a precipitation method.

The polymerization conditions for the emulsion polymerization may be, for example, at 30° C. to 95° C. and for 1 hour to 10 hours.

Examples of emulsifiers include general emulsifiers for emulsion polymerization (potassium rosinate, a sodium alkylbenzene sulfonate, etc.).

Examples of polymerization initiators include organic and inorganic oxide initiators.

Examples of chain transfer agents include mercaptans, α-methylstyrene dimer, terpenes, and the like.

As for the precipitation method, the same method as used for recovering the graft copolymer (A) from the latex of the graft copolymer (A) can be employed.

For producing the vinyl copolymer (B) by the suspension polymerization method, for example, the production can be implemented by a method in which the vinyl monomer mixture (m2), a dispersant, a dispersion aid, a polymerization initiator and a chain transfer agent are fed into a reactor and heated to perform polymerization, followed by dehydrating and drying the resulting slurry, to thereby recover the vinyl copolymer (B).

The polymerization conditions for the suspension polymerization may be, for example, at 60° C. to 150° C. and for 1 hour to 20 hours.

Examples of dispersants include tricalcium phosphite, polyvinyl alcohol, and the like.

Examples of dispersion aids include a sodium alkylbenzenesulfonate, and the like.

Examples of polymerization initiators include organic peroxides, and the like.

Examples of chain transfer agents include mercaptans, α-methylstyrene dimer, terpenes, and the like.

[Metal Component (C)]

The metal component (C) is an alkali metal. Among alkali metals, sodium (Na) and potassium (K) are preferable. More preferably, the metal component (C) includes potassium. The metal component (C) may be one derived from a compound containing a metal component used in the production of the graft copolymer (A) or the vinyl copolymer (B). Alternatively, the metal component (C) may be one blended as a compound containing a metal component blended during production of the thermoplastic resin composition, which is described in a later section.

[Other Thermoplastic Resins]

Examples of other thermoplastic resins include polycarbonate, polybutylene terephthalate (PBT), polyethylene terephthalate (PET), polyvinyl chloride, polystyrene, polyacetal, a modified polyphenylene ether (modified PPE), an ethylene-vinyl acetate copolymer, polyarylate, a liquid crystalline polyester, polyethylene, polypropylene, fluororesin, polyamide (nylon), and the like.

[Additives]

Examples of additives include antioxidants, lubricants, processing aids, pigments, dyes, fillers, silicone oils, paraffin oils, and the like.

[Amounts of Components]

The amount of the graft copolymer (A) in the thermoplastic resin composition is preferably 20 parts by mass to 80 parts by mass, more preferably 30 parts by mass to 70 parts by mass, even more preferably from 40 parts by mass to 60 parts by mass, with respect to the total mass (100 parts by mass) of the thermoplastic resin composition. When the amount of the graft copolymer (A) is not less than the lower limit value described above, the molded article improves in terms of mechanical properties. When the amount of the graft copolymer (A) is not more than the upper limit value described above, the molded article improves in terms of color development and appearance.

In the thermoplastic resin composition, the amount of the metal component (C) is 60 ppm or more, preferably 100 ppm or more, more preferably 100 ppm to 700 ppm, even more preferably 100 ppm to 400 ppm, relative to the total mass of the thermoplastic resin composition. When the amount of the metal component (C) is less than 60 ppm, the effect of suppressing heat discoloration cannot be obtained. When the amount of the metal component (C) is 100 ppm or more, the effect of suppressing heat discoloration improves further. When the amount is less than 700 ppm, the appearance of the molded article improves.

In the present specification, the amount of the metal component (C) is a value measured by the method described in the Examples described in a later section. Specifically, the amount of the metal component (C) is determined by quantifying the metal component using a fluorescent X-ray device ("MagiX PRO" manufactured by Spectris Co., Ltd.) to measure the amount of the metal component (C) contained in the thermoplastic resin composition.

[Method for Producing Thermoplastic Resin Composition]

The method for producing the thermoplastic resin composition is not particularly limited. For example, the thermoplastic resin composition can be produced by mixing and dispersing the graft copolymer (A), the vinyl copolymer (B), the metal component (C), and if necessary other components (other thermoplastic resins, additives, etc.) with a V-type blender, a Henschel mixer or the like, and melt-kneading the resulting mixture using a melt-kneader such as a screw extruder, a Banbury mixer, a pressure kneader, or mixing rolls. After melt-kneading, the melt-kneaded product may be pelletized using a pelletizer or the like, if necessary.

<Technical Effects>

In the thermoplastic resin composition of the present embodiment described above, the graft copolymer (A), the vinyl copolymer (B), and the metal component (C) are included; the amount of the metal component (C) is 60 ppm or more, based on the total mass of the thermoplastic resin composition; the graft copolymer (A) is a graft polymer obtained by polymerizing 80% by mass to 20% by mass of the vinyl monomer mixture (m1) containing at least one type of vinyl monomer in the presence of 20% by mass to 80% by mass of the rubbery polymer (a) including a polyorganosiloxane and an alkyl (meth)acrylate polymer; the graft copolymer (B) is a vinyl copolymer obtained by polymerizing the vinyl monomer mixture (m2) including an alkyl (meth)acrylate monomer; and the metal component (C) is an alkali metal. Due to these features, the thermoplastic resin composition of the present embodiment can provide a molded article having excellent heat discoloration resistance.

[Molded Article]

The molded article according to one embodiment of the present invention is composed of the thermoplastic resin composition of the present embodiment. In other words, the molded article of the present embodiment is obtained by molding the thermoplastic resin composition of the present embodiment by a known molding method.

Examples of molding methods include an injection molding method, a press molding method, an extrusion molding method, a vacuum molding method, a blow molding method, and the like.

Examples of applications of the molded article include vehicle exterior parts, office equipment, home appliances, building materials, and the like. Among these, vehicle exterior parts are preferred.

In the molded article of the present embodiment described above, the thermoplastic resin composition of the present embodiment is used, which enables the molded article to show excellent heat discoloration resistance.

EXAMPLES

Hereinbelow, specific examples are shown. However, the present invention is in no way limited by these examples.

In the following description, "%" refers to "% by mass", and "parts" refers to "parts by mass".

The various measurements and evaluations were performed in the Examples and Comparative Examples by respective methods as described below.

<Evaluation of Heat Discoloration>

Pellets of the thermoplastic resin composition were molded using a 30-ton injection molding machine ("NEX30W-3E" manufactured by Nissei Plastic Industrial Co., Ltd.) at cylinder temperatures of 230° C. and 280° C. and mold temperature of 60° C., thereby obtaining molded articles each having a length of 80 mm, a width of 55 mm and a thickness of 2 mm.

With respect to both of the molded articles obtained at 230° C. and 280° C., b* showing the intensity of color ranging from blue to yellow was measured by the SCE method using an ultraviolet visible near infrared spectrophotometer ("V-670" manufactured by JASCO Corporation), and the heat discoloration index Δb* was calculated by the following formula (1). A smaller value of Δb* means that the heat discoloration is more suppressed, which is favorable.

$$\Delta b^* = b^*_{(280°\ C.)} - b^*_{(230°\ C.)} \quad (1)$$

In the above formula (1), $b^*_{(230°\ C.)}$ is the b* value of the molded article obtained at 230° C., and $b^*_{(280°\ C.)}$ is the b* value of the molded article obtained at 280° C.

<Evaluation of Appearance of Molded Article>

Using an 85-ton injection molding machine ("J85AD-110H" manufactured by The Japan Steel Works, Ltd.), pellets of the thermoplastic resin composition were molded into a dumbbell specimen for use in the ISO 178 test at a cylinder temperature of 280° C. and a mold temperature of 60° C., and the obtained test specimen was examined visually to determine whether or not silver streaks had occurred on the test specimen. The evaluation criteria are as shown below.

A: No occurrence of silver streak
B: Minor silver streaks occurred in one or two locations
C: Silver streaks occurred in three or more locations <Amount of Metal Component>

With respect to the molded article evaluated for heat discoloration, the metal components were quantified using a fluorescent X-ray device ("MagiX PRO" manufactured by Spectris Co., Ltd.) to measure the concentrations of sodium (Na) and potassium (K) contained in the thermoplastic resin composition.

<Polyorganosiloxane (s)>

(Production of Polyorganosiloxane (s-1))

98 parts of octamethylcyclotetrasiloxane and 2 parts of y-methacryloyloxypropyldimethoxymethylsilane were mixed to obtain 100 parts of a siloxane mixture. An aqueous solution of 0.67 parts of sodium dodecylbenzenesulfonate and 300 parts of ion-exchanged water was added to the siloxane mixture. The resulting was stirred for 2 minutes at 10,000 rpm with a homomixer, and was then passed through a homogenizer twice under a pressure of 300 kg/cm$^2$, thereby yielding a stable premixed organosiloxane latex. Separately, 10 parts of dodecylbenzenesulfonic acid and 90 parts of ion-exchanged water were fed into a reactor equipped with a reagent injection container, a cooling pipe, a jacket heater and a stirring device to prepare a 10% aqueous solution of dodecylbenzenesulfonic acid (acid catalyst aqueous solution). While heating this acid catalyst aqueous solution to 85° C., the premixed organosiloxane latex was dropwise added thereto over 2 hours. After completion of the dropwise addition, the solution was kept at that temperature for 3 hours, and was then cooled down to 40° C. The resulting reaction product was neutralized to pH 7.0 with a 10% aqueous sodium hydroxide solution to obtain a latex of polyorganosiloxane (s-1). The solid content was measured with respect to a portion of the latex of polyorganosiloxane (s-1) dried at 180° C. for 30 minutes, and was found to be 18.2%. Further, the mass average particle size of particles dispersed in the latex was 30 nm.

<Graft Copolymer (A)>

(Production of Graft Copolymer (A-1))

Into a reactor equipped with a reagent injection container, a cooling pipe, a jacket heater and a stirring device, 6.0 parts (solid content) of a latex of polyorganosiloxane (s-1), 0.5 parts of sodium alkyldiphenylether disulfonate was fed, followed by addition of 190 parts of ion-exchanged water, and the resulting was mixed. This was followed by addition of a mixture of 44.0 parts of n-butyl acrylate as a monomer for forming the alkyl (meth)acrylate rubbery polymer (a-1), 0.2 parts of allyl methacrylate, 0.06 parts of 1,3-butylene glycol dimethacrylate, and 0.1 part of t-butyl hydroperoxide. A nitrogen gas was flown through this reactor so as to substitute the inside atmosphere with nitrogen, and the temperature was raised to 60° C. When the internal temperature of the reactor reached 60° C., an aqueous solution of 0.0001 part of ferrous sulfate, 0.0003 parts of disodium ethylenediaminetetraacetate, and 0.2 parts of Rongalite in 10 parts of ion-exchanged water was added to initiate a radical polymerization. Due to the polymerization of the alkyl (meth)acrylate component, the temperature of the solution increased to 78° C. This state was maintained for 1 hour, and the polymerization was continued until the heat of polymerization became no longer detectable, thereby obtaining a latex of composite rubbery polymer (a-1). The volume average particle size of the alkyl (meth)acrylate rubbery polymer (a-1) dispersed in the latex was 88 nm.

Then, after the liquid temperature inside the reactor decreased to 60° C., an aqueous solution of 0.3 parts of Rongalite in 10 parts of ion-exchanged water was added. Next, a mixed solution of 2.5 parts of acrylonitrile, 7.5 parts of styrene, and 0.05 parts of t-butyl hydroperoxide was dropwise added over about 1 hour to implement the polymerization. After the dropping was completed, the resulting was held for 1 hour, followed by addition of an aqueous solution of 0.0002 parts of ferrous sulfate, 0.0006 parts of disodium ethylenediaminetetraacetate, and 0.25 parts of Rongalite in 10 parts of ion-exchanged water. Next, a mixed solution of 10.0 parts of acrylonitrile, 30.0 parts of styrene, and 0.2 parts of t-butyl hydroperoxide was dropwise added over about 40 minutes to implement the polymerization. After the completion of the dropwise addition, the resulting was allowed to stand for 1 hour, and was then cooled, thereby yielding a graft copolymer (A-1) latex. Subsequently, 250 parts of a 2% aqueous solution of calcium acetate was heated to 50° C. and stirred. 100 parts of the graft copolymer (A-1) latex was gradually dropwise added into this aqueous solution of calcium acetate to cause coagulation. The resulting coagulated product was separated, washed, and then dried, thereby yielding a graft copolymer (A-1) in the form of a dried powder.

<Vinyl Copolymer (B)>
(Vinyl Copolymer (B-1))

Polymethyl methacrylate "Acrypet VH5" (manufactured by Mitsubishi Chemical Corporation, 98 parts of methyl methacrylate, 2 parts of methacrylic acid, mass average molecular weight (Mw) 7×10 3) was used as the vinyl copolymer (B-1).

<Metal Component (C)>
(Metal Component (C-1))

An aqueous solution of dipotassium alkenylsuccinate (trade name: Latemul ASK, manufactured by Kao Corporation) was used as a compound containing potassium.

<Metal Component (C)>
(Metal Component (C-2))

Anhydrous sodium pyrophosphate (manufactured by Fujifilm Wako Pure Chemical Corporation) was used as a compound containing sodium.

<Metal Component (C)>
(Metal Component (C-3))

Sodium acetate trihydrate (manufactured by Fujifilm Wako Pure Chemical Corporation) was used as a compound containing sodium.

Example 1

45 Parts of the graft copolymer (A-1), 55 parts of the vinyl copolymer (B-1), 0.4 parts of the metal component (C-1), 0.5 parts of ethylenebisstearylamide, 0.3 parts of ADEKA STAB LA-36 (manufactured by ADEKA Corporation), 0.3 parts of ADEKA STAB LA-63P (manufactured by ADEKA Corporation), and 5 parts of titanium oxide as a colorant were mixed using a Henschel mixer. The resulting was melt-kneaded at a cylinder temperature of 240° C. using a twin-screw extruder ("TEX-28V" manufactured by Japan Steel Works, Ltd.) having a 28 mmφ vacuum vent, and then pelletized using a pelletizer ("SH type pelletizer" manufactured by Soken Kogyo Co., Ltd.) to obtain pellets of thermoplastic resin composition. Using the obtained thermoplastic resin composition, molded articles for respective evaluations were produced, and heat discoloration and appearance were evaluated.

The amount of the added metal component (C) and the amounts of the added additive and colorant are respective ratios thereof relative to the total mass (100 parts) of the graft copolymer (A) and the vinyl copolymer (B).

The results are shown in Table 1 and Table 2. In Table 1, the blending amount of the metal component (C) represents the blending amount of the compound containing the metal component (C).

Examples 2 to 9, Comparative Examples 1 and 2

Thermoplastic resin compositions were prepared in the same manner as in Example 1 except that the blending ratios were varied as shown in Tables 1 and 2, and respective molded articles were produced to evaluate thermal discoloration and appearance thereof. The results are shown in Table 1 and Table 2.

TABLE 1

|  |  |  | Ex. 1 | Ex. 2 | Ex. 3 | Ex. 4 | Ex. 5 | Ex. 6 | Comp. Ex. 1 |
|---|---|---|---|---|---|---|---|---|---|
| Blending recipe | Graft copolymer (A) | (A-1) | 45 | 45 | 45 | 45 | 45 | 45 | 45 |
|  | Vinyl copolymer (B) | (B-1) | 55 | 55 | 55 | 55 | 55 | 55 | 55 |
|  | Metal component (C) | (C-1) | 0.4 | 0.79 |  |  |  |  |  |
|  |  | (C-2) |  |  | 0.027 |  |  |  |  |
|  |  | (C-3) |  |  |  | 0.36 | 0.18 | 0.6 |  |
|  | Colorant | Titanium oxide | 5 | 5 | 5 | 5 | 5 | 5 | 5 |
| Amount (ppm) of metal component in thermoplastic composition | | K | 160 | 270 | 15 | 1 | 13 | 10 | 11 |
| | | Na | 39 | 34 | 72 | 440 | 250 | 696 | 33 |
| | | Total alkali metal content | 199 | 304 | 87 | 441 | 263 | 706 | 44 |
| Heat discoloration | | Δb* | 0.4 | 0.45 | 0.79 | 0.43 | 0.41 | 0.34 | 1.29 |
| Appearance of molded article (silver streak) | | | — | A | A | A | B | A | C | A |

TABLE 2

|  |  |  | Ex. 7 | Ex. 8 | Ex. 9 | Comp. Ex. 2 |
|---|---|---|---|---|---|---|
| Blending recipe | Graft copolymer (A) | (A-1) | 70 | 90 | 45 | 45 |
|  | Vinyl copolymer (B) | (B-1) | 30 | 10 | 55 | 55 |
|  | Metal component (C) | (C-1) |  |  |  |  |
|  |  | (C-2) |  |  |  |  |
|  |  | (C-3) |  |  | 0.18 |  |
|  | Colorant | Titanium oxide | 5 | 5 |  |  |
| Amount (ppm) of metal component in thermoplastic composition |  | K | 19 | 25 | 10 | 10 |
|  |  | Na | 65 | 72 | 290 | 33 |
|  |  | Total alkali metal content | 84 | 97 | 300 | 43 |
| Heat discoloration |  | Δb* | 0.8 | 0.79 | 0.61 | 1.05 |
| Appearance of molded article (silver streak) |  | — |  | B | C | A | A |

The molded articles obtained from the thermoplastic resin compositions of Examples 1 to 9 are excellent in heat discoloration resistance.

Thus, it has been confirmed that a molded article having excellent heat discoloration resistance can be obtained by using the thermoplastic resin composition of the present invention.

In addition, the molded articles obtained from the thermoplastic resin compositions of Examples 1 to 3, 5 and 9 are also excellent in appearance.

On the other hand, the molded articles obtained from the thermoplastic resin compositions of Comparative Examples 1 and 2 are inferior in heat discoloration resistance.

INDUSTRIAL APPLICABILITY

Molded articles using the thermoplastic resin composition of the present invention are useful as vehicle interior and exterior parts, office equipment, home appliances, building materials, etc., and are particularly useful as vehicle exterior parts.

The invention claimed is:

1. A thermoplastic resin composition comprising a graft copolymer (A), a vinyl copolymer (B), and a metal ion or metal ion-containing component (C), wherein:
   an amount of the metal ion or metal ion-containing component (C) is 60 ppm or more relative to a total mass of the thermoplastic resin composition,
   the graft copolymer (A) is a graft polymer obtained by polymerizing 80% by mass to 20% by mass of a vinyl monomer mixture (m1) including at least one type of vinyl monomer in the presence of 20% by mass to 80% by mass of a rubbery polymer (a) obtained from a polyorganosiloxane and an alkyl (meth)acrylate polymer, provided that a total mass of the rubbery polymer (a) and the vinyl monomer mixture (m1) is 100% by mass,
   the vinyl copolymer (B) is a vinyl copolymer obtained by polymerizing a vinyl monomer mixture (m2) including an alkyl (meth)acrylate monomer, and
   the metal of the metal ion or metal ion-containing component (C) is an alkali metal.

2. The thermoplastic resin composition according to claim 1, wherein the amount of the metal ion or metal ion-containing component (C) is 100 ppm to 400 ppm relative to the total mass of the thermoplastic resin composition.

3. The thermoplastic resin composition according to claim 1, wherein the metal ion or metal ion-containing component (C) comprises potassium.

4. The thermoplastic resin composition according to claim 1, wherein an amount of the graft polymer (A) is 20 parts by mass to 80 parts by mass relative to a total mass of the thermoplastic resin composition.

5. A molded article formed from the thermoplastic resin composition of claim 1.

\* \* \* \* \*